May 3, 1932.  A. MOORHOUSE  1,856,964
MOTOR VEHICLE
Filed Jan. 7, 1927  2 Sheets-Sheet 1

Inventor
ALFRED MOORHOUSE
By Milton Sitts
Attorney

May 3, 1932.  A. MOORHOUSE  1,856,964
MOTOR VEHICLE
Filed Jan. 7, 1927  2 Sheets-Sheet 2

Inventor
ALFRED MOORHOUSE
By  Attorney

Patented May 3, 1932

1,856,964

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed January 7, 1927. Serial No. 159,515.

This invention relates to motor vehicles and more particularly to improvements in the body and frame construction of motor vehicles.

It has been customary heretofore, in motor vehicle construction, to position the body sills directly on top of the frame side members. With this arrangement, the floor of the body is necessarily elevated above the top of the frame an amount equal to the thickness of the sill or else the sill projects above the level of the floor. In either case a disadvantage is present, because either the center of gravity of the vehicle is raised and its appearance is altered or the user is compelled to step over the sill in leaving or boarding the car. Difficulty has otherwise been encountered, because the differential housing and the wheels of the car prevent the body from being lowered beyond a certain point. In one form of motor vehicle construction designed to lower the frame and body, the chassis frame side members are provided at their rear ends, with kick-up portions adapted to insure a clearance for the body and frame with respect to the rear axle, wheels and differential housing. In mounting the body on a frame of this character, the body sills are ordinarily provided with similar kick-up portions, adapted to fit onto the corresponding portions of the frame.

It is an object of the present invention to lower the center of gravity of a motor vehicle.

Another object is to improve the appearance of a motor vehicle.

A still further object is to improve the body and frame construction of a motor vehicle.

A related object is to strengthen the body and frame of a motor vehicle.

A feature of the invention is a member adapted to provide a housing for the wheels of a motor or other vehicle, to reinforce the frame and to support the body thereof.

A further feature is a structure, wherein a vehicle body is supported upon the lower flange of a frame member the upper flange of which has been replaced by an extension adapted to form a wheel housing An additional feature is a vehicle body, having sills supported upon a frame, and including a semi-circular recess providing a wheel housing, with a reinforcing member adapted to strengthen the body at the point of support.

Broadly the invention resides in a structure including a supporting frame and a vehicle body mounted thereon. The frame includes a member adapted to provide reinforcement therefor, to support the body and to house a wheel of the vehicle. The body includes a reinforcing member co-operating with the frame member to brace and support the body. The body sills are positioned on the frame, below the upper edge thereof, to lower the center of gravity of the body. The several elements described co-operate to provide a unitary body and frame structure such that the equilibrium and the appearance of the vehicle are improved.

Other features and objects of the invention will appear from the following description taken in connection with the drawings, which form a part of this specification.

Like reference characters have been used to indicate like parts in the several figures of the drawings wherein.

Figure 1:
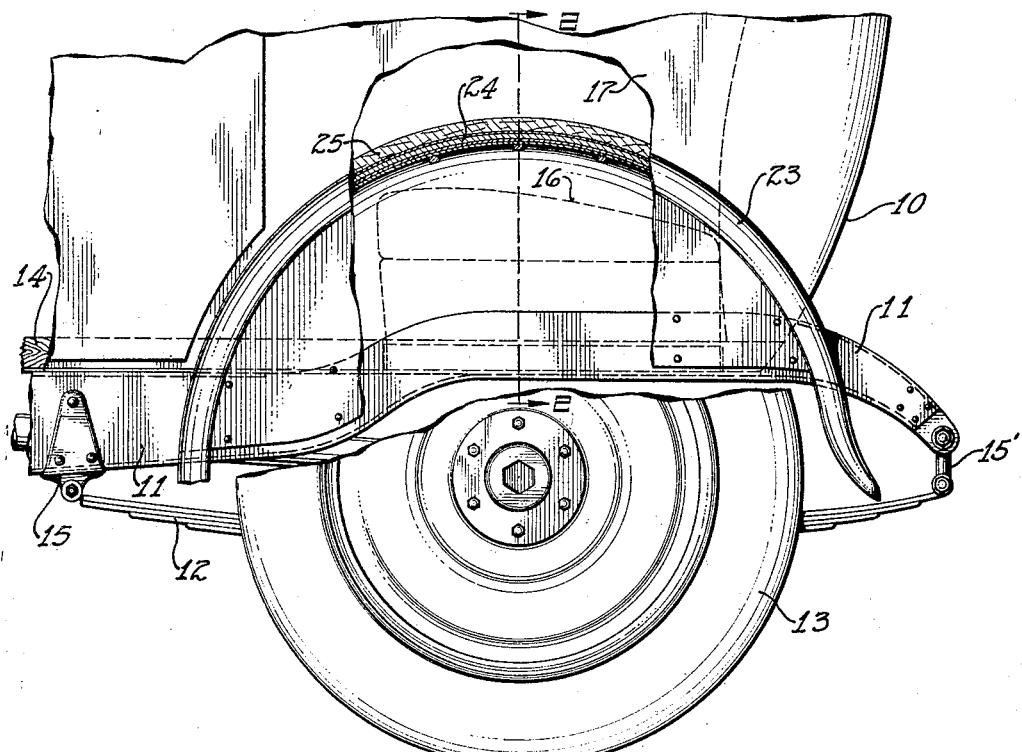
Fig. 1 is a view in side elevation, partly in section on line 1—1 of Fig. 2, of a part of the rear end of a motor vehicle, embodying this invention.
Figure 2:
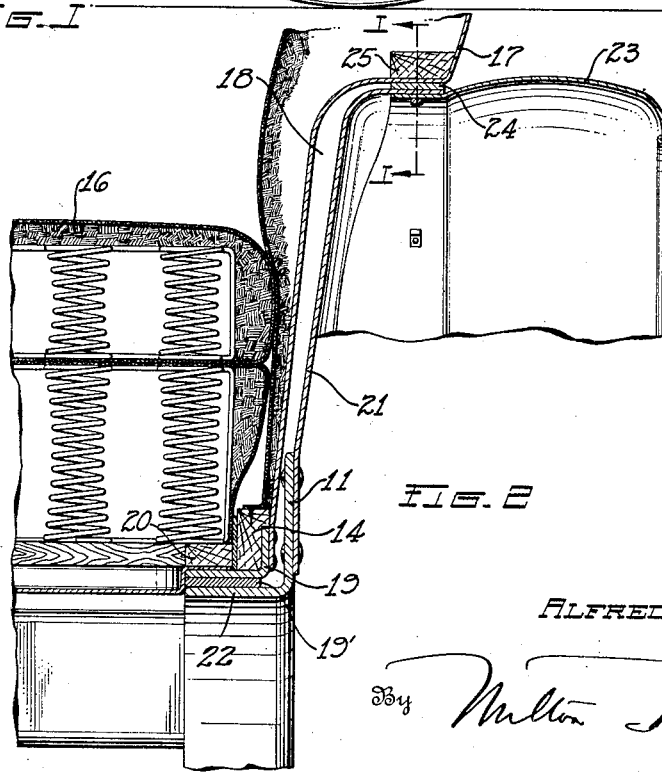
Fig. 2 is a view in section on line 2—2 of Fig. 1.

Figs. 1 and 2 illustrate a part of the rear end of a motor vehicle including a body 10, mounted on a frame 11, supported by springs 12 attached to an axle, not shown, having wheels 13 thereon. The springs are attached to the frame by a front bracket 15 and a rear shackle 15'.

Figures 4, 5:
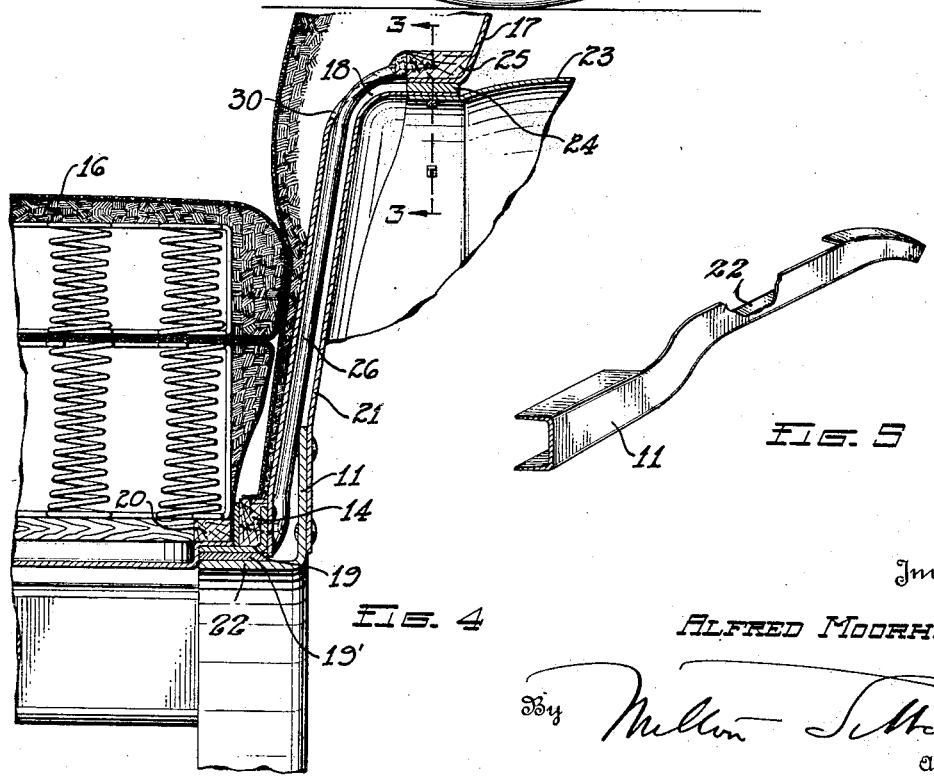
Fig. 4 is a view in section on line 4—4 of Fig. 3.
Fig. 5 is a perspective view of the kick-up portion of the frame of Figs. 1 to 4.

The body includes a rear seat 16 of any suitable construction and side panel members 17, which may be of metal. The body also includes supporting sills 14, one only of which is shown. The sills rest upon the lower flange of the side frame members 11, which have a portion of the upper flange removed as illustrated in Fig. 5. The body panels, adjacent to the rear wheels, are formed with a semi-circular recess 18 to provide sufficient clearance between the body and the wheels to allow for the movement occasioned by the springs. These recesses also make it unnecessary to limit the width of the entire rear portion of the body to the distance between the rear wheels.

The panel member 17 is attached, at its lower edge, to an angle-shaped member or bracket 19 which may be bolted or otherwise suitably attached to the sill 14. The bracket is preferably of iron and the sill of wood. The bracket 19 extends beyond the inner edge of the sill 14 and provides a support for the frame member 20 of the seat 16. The upholstery for the side of the rear seat may also be attached to the upper surface of the sill 14, in the manner illustrated. Between the flange of the frame 11 and the bracket 19 or sill 14 is a lining strip 19' of webbed or other suitable material to prevent wear and noise caused by relative movement of the body and frame. A curved semi-circular plate 21 is attached to the web of the side frame member 11 and extends vertically and laterally therefrom. This plate provides a reinforcement for the portion of the side frame member 11 along which the upper flange has been removed. This member also functions, in co-operation with a fender, to provide a wheel housing.

The fender 23 is attached to the member 21 and also to the body panel 17. Between the elements 21 and 17, at the point of attachment of the fender, is provided a lining strip 24 as a cushion for preventing wear and noise caused by the relative movement of the separated members. A curved body frame member 25 preferably of wood forms an arch extending around the wheel housing on the inside of the body panel and serves as a body support at this point.

The body panel 17 is preferably constructed of material sufficiently strong to withstand considerable force either of compression or tension and the member 21 is likewise of relatively heavy material. The members 17 and 21 may be for example of steel. These members co-operate to reinforce and support the body 10 and fender 23 and to provide a housing for the wheel.

The structure shown in Figs. 1 and 2 has advantages relating to improvement in the appearance and stability of the vehicle. The provision of a kick-up portion on the frame enables the main parts of the frame and body to be materially lowered. This results in a lowering of the center of gravity of the entire car, whereby its equilibrium and appearance are improved. Ordinarily a similar kick-up portion on the body sills is required to fit on to the corresponding portion of the frame, but in the present invention the upper flange of the frame side member is removed along the kick-up to permit the body sill to rest on the lower flange. The sills may therefore be straight, whereby their construction is simplified.

The structure of this invention also provides an exceedingly secure attachment of the body to the frame. The web of the side frame members functions to prevent sidewise movement of the body, since the body sills are positioned upon the lower flange 22. Additional means must be provided to perform this function, when the sills are mounted on the upper flange of the side frame members in the usual manner.

Figure 3:
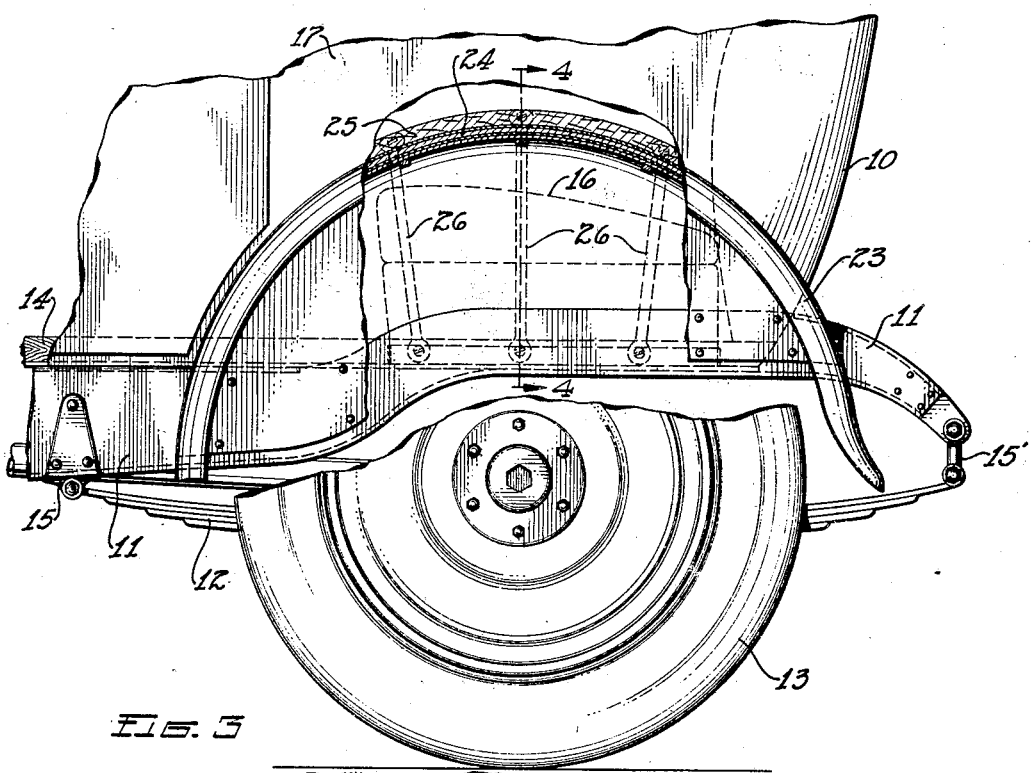
Fig. 3 is a view similar to Fig. 1 showing a modification of the invention.

In Figs. 3 and 4 a modification of the structure shown in Figs. 1 and 2 is illustrated. These figures will not be described in detail, because in most respects they are substantially the same as Figs. 1 and 2.

The structure of Figs. 3 and 4 differs in the respect that braces 26 are provided for supporting the body panel member 17. This member may therefore be constructed of light sheet metal or other suitable light material, which need not be capable of withstanding severe strain. The braces 26 are positioned along the inner surface of the recess 18 in the body panel 17. The upper ends of the braces, which extend through suitable openings 30 in the panel 17, are attached to the members 25 and their lower ends are suitably attached to the outer side of the sills 14. The braces 26 therefore are adapted to reinforce the body and relieve the strain on the body panel member 17. In other material respects the structure of Figs. 3 and 4 is similar to that of Figs. 1 and 2. The body sills 14 are supported on the lower flange 22 of the kick-up on the frame in the same manner as described in connection with Figs. 1 and 2, whereby straight sills may be employed, the center of gravity of the vehicle is lowered and its appearance improved. The semi-circular member 21 provides a reinforcement for the side of the frame member as well as a housing for the wheel and a support for the body and for the fender 23.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle having a frame member with a portion thereof removed and a body structure including a panel, supporting sill members for said body arranged in relatively different horizontal planes, the upper sill being adapted to form a support for the panel and the lower sill being adapted to rest on the frame member at the zone of the removed portion, said body panel being secured to the lower sill, a stiffening member extending between the sills and secured at either end thereto, and a housing for a wheel of the vehicle secured at one side thereof to the frame member at the zone of the removed portion and secured at the other side thereof to the said upper sill, said housing being adapted to reinforce the frame member at the point where it has been weakened by the removal of a portion thereof.

2. In a vehicle having a frame member with a portion thereof removed and a body structure including a panel, supporting sill members for said body arranged in relatively different horizontal planes, the upper sill being adapted to form a support for the panel and the lower sill being adapted to rest on the frame member at the zone of the removed portion, said body panel being secured to the lower sill, and a housing for a wheel of the vehicle secured at one side thereof to the frame member at the zone of the removed portion and secured at the other side thereof to the said upper sill, said housing being adapted to reinforce the frame member at the point where it has been weakened by the removal of a portion thereof.

3. In a vehicle, a frame member having flanges in different planes, a portion of one of said flanges lying in the plane of a portion of another of said flanges, a body sill supported on the portions of said flanges lying in the same plane, another body sill spaced from the first and in a higher plane relative thereto, a body partially supported by said sills and having a panel secured to the lower sill, the upper sill being adapted to form an auxiliary support for the panel, and a housing for a wheel of the vehicle secured at one side thereof to the frame member and secured at the other side thereof to the upper sill, said housing being adapted to form a support for the frame member.

4. In a motor vehicle, a chassis frame including a side frame member of channel shape, said member having a straight portion and a kick-up portion, the upper flange of the kick-up portion being cut away, and the lower flange thereof being in substantially the same horizontal plane as the upper flange of said straight portion, a body sill supported on the portions of said flanges lying in the same plane, another body sill spaced from the first and lying in a higher plane relative thereto, a body partially supported by the said sills and having a panel portion secured to the lower sill, the upper sill being adapted to form a support for a portion of the panel, a stiffening member between the two sills and secured at either end thereto, and a housing for a wheel of the vehicle secured at one side thereof to the frame member at the zone of the removed portion and secured at the other side thereof to the upper sill, said housing being adapted to reinforce the frame member at the point where it has been weakened by the removal of a portion thereof.

5. In a motor vehicle, a chassis frame including a side frame member of channel shape, said member having a straight portion and a kick-up portion, the upper flange of the kick-up portion being cut away, and the lower flange thereof being in substantially the same horizontal plane as the upper flange of said straight portion, a body sill supported on the portions of said flanges lying in the same plane, another body sill spaced from the first and lying in a higher plane relative thereto, a body partially supported by the said sills and having a panel portion secured to the lower sill, the upper sill being adapted to form a support for a portion of the panel, and a stiffening member between the two sills and secured at either end thereto.

6. In a motor vehicle, a chassis frame including a side frame member of channel shape, said member having a straight portion and a kick-up portion, the upper flange of the kick-up portion being cut away, and the lower flange thereof being in substantially the same horizontal plane as the upper flange of said straight portion, a body sill supported on the portions of said flanges lying in the same plane, another body sill spaced from the first and lying in a higher plane relative thereto, a body partially supported by the said sills and having a panel portion secured to the lower sill, the upper sill being adapted to form a support for a portion of the panel, and a housing for a wheel of the vehicle secured at one side thereof to the frame member at the zone of the removed portion and secured at the other side thereof to the upper sill, said housing being adapted to reinforce the frame member at the point where it has been weakened by the removal of a portion thereof.

In testimony whereof I affix my signature.

ALFRED MOORHOUSE.